Patented Mar. 7, 1933

1,900,649

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

PURIFICATION OF CRUDE DICARBOXYLIC ACIDS

No Drawing.  Application filed July 20, 1931.  Serial No. 552,077.

This invention relates to the purification of crude dicarboxylic acids and particularly crude acids produced by vapor phase catalytic reactions such as phthalic and maleic acids produced by the catalytic oxidation of naphthalene or maleic acid produced by the catalytic oxidation of benzene or similar mononuclear hydrocarbons.

Crude maleic or phthalic acids are frequently recovered in the form of water solutions and contain many impurities which are difficult of removal by ordinary purification processes. This is especially true in the case of maleic acid which cannot be sublimed without large loss by transformation to fumaric acid.

I have found that there are two classes of solvents which can be used in purifying crude dicarboxylic acids produced by catalytic means such as crude maleic acid, crude phthalic acid or crude naphthalic acid. These solvents may be used singly or in combination and possess excellent powers for dissolving the crude acid at a high temperature and permitting it to crystallize out on cooling. These solvents are esters of the acids themselves and hydrogenated polynuclear aromatic hydrocarbons such as tetra- and decahydronaphthalene. The esters are particularly advantageous by reason of their high boiling point, which minimizes the difficulties of handling and losses, and permits operating with a relatively large temperature differential, thus permitting the use of a relatively small amount of solvent.

The crystallization may be effected purely by cooling or by the addition of a material in which the acid is not soluble and which decreases the amount of acid which the solvent will hold at a particular temperature. Such materials are liquid mononuclear hydrocarbons, such as benzol, toluol, etc.

The invention will be described in greater detail in connection with the following specific examples:

Example 1

A crude maleic acid obtained as a by-product from the catalytic oxidation of naphthalene is dissolved in diethylmaleate at a temperature somewhat below the boiling point of the ester, for example about 140° C. The hot solution may be clarified, if desired, by the addition of a suitable adsorbent carbon and hot filtration, although this is not necessary if the crude is not too highly colored. On cooling, a mixture of maleic acid and maleic anhydride crystallizes out and is removed by ordinary filtration. The ester containing a small amount of the acid may then be distilled off, or if the amount of impurities is not too great it may be reused with a fresh bath of maleic acid, the reuse continuing as long as the impurities do not build up sufficiently in amount to affect the color of the product crystallizing out.

Example 2

Crude maleic acid produced by the catalytic oxidation of benzol is dissolved in a mixture of equal parts of dimethylmaleate and tetraline, the amount being approximately 20 kg. of crude maleic acid to 100 liters of solvent. The solution may be effected at 135° C. and cooled with or without preliminary clarification by adsorbents as described in Example 1. About half of the weight of crude solids are recovered in a single recrystallization in the form of mixture of maleic acid and maleic anhydride. The solvent may be concentrated by distilling off a portion and a further amount of acid permitted to crystallize out, the remainder of the mother liquor then being distilled off and the residue thrown away. The second batch of maleic acid is not of as high purity as the first, but is considerably purer than the original crude product and may either be used for purposes which do not demand a product of the highest purity or it may be added to a fresh batch of crude and rerun.

Example 3

Crude phthalic acid from the catalytic oxidation of naphthalene is dissolved in diethyl phthalate in the proportion of about 25 kg. of phthalic acid to 100–120 liters of solvent, the solution being effected at about 150° C. The solution may be treated with adsorbent carbon, and filtered hot if desired, and is then permitted to cool to room temperature. A pure white phthalic anhydride crystallizes out.

In some cases it is desirable to wash out the solvent from the various filter cakes obtained by the filtrations, as the esters are relatively expensive and are undesirable contaminants of the acid since they are so high boiling that they do not readily evaporate. They can be easily washed out of the cake by means of benzol or a similar aromatic hydrocarbon in which the acid is insoluble. When a volatile hydrocarbon such as benzol is used it displaces the ester and can be evaporated from the cake. Washing with benzol or similar hydrocarbon also effects an additional purification as some of the coloring matter present in the crude acid is soluble in benzol.

What is claimed as new is:

1. A method of purifying crude polycarboxylic acids obtained from vapor phase catalytic reactions, which comprises recrystallizing the acid from a solvent included in the group esters of the polycarboxylic acid being treated, hydrogenated polynuclear aromatic hydrocarbon mixtures of the esters and hydrogenated polynuclear aromatic hydrocarbons.

2. A method according to claim 1, in which the acid is maleic acid.

3. A method according to claim 1, in which the acid is maleic acid obtained as a by-product from the air-oxidation of naphthalene.

4. A method of purifying crude polycarboxylic acids obtained from catalytic vapor phase reactions, which comprises recrystallizing the acid from its ester.

5. A method according to claim 4, in which the acid is maleic acid.

6. A method according to claim 4, in which the acid is maleic acid obtained as a by-product from the catalytic air-oxidation of naphthalene.

7. A method according to claim 1, in which the solvent is a mixture of the ester of the acid being treated and a hydrogenated naphthalene.

8. A method of purifying crude polycarboxylic acids obtained from vapor phase catalytic reactions, which comprises dissolving the crude acid at a temperature above the boiling point of water in a solvent included in the group consisting of esters of the acid being treated, hydrogenated polynuclear aromatic hydrocarbons, cooling to room temperature, filtering, concentrating the mother liquor, again filtering and adding the precipitate from the second filtration to a fresh batch of crude acid, and repeating the cycle.

9. A method according to claim 8, in which the acid is maleic acid.

10. A method of purifying crude polycarboxylic acids obtained from vapor phase catalytic reactions, which comprises dissolving the crude acid at a temperature above the boiling point of water in a solvent included in the group consisting of esters of the acid being treated, hydrogenated polynuclear aromatic hydrocarbons, cooling to room temperature, filtering and washing the cake with an aromatic hydrocarbon in which the acid is not soluble.

11. A method of purifying crude polycarboxylic acids obtained from vapor phase catalytic reactions, which comprises dissolving the crude acid at a temperature above the boiling point of water in a solvent included in the group consisting of esters of the acid being treated, hydrogenated polynuclear aromatic hydrocarbons, cooling to room temperature, filtering, concentrating the mother liquor, again filtering and washing both precipitates with an aromatic hydrocarbon in which acid is not soluble.

12. A method according to claim 10, in which the polycarboxylic acid is crude maleic acid.

13. A method according to claim 11, in which the polycarboxylic acid is crude maleic acid.

14. A method according to claim 10, in which the polycarboxylic acid is crude maleic acid and the aromatic hydrocarbon is a mononuclear liquid aromatic hydrocarbon of the benzene series.

15. A method according to claim 11, in which the polycarboxylic acid is crude maleic acid and the aromatic hydrocarbon is a mononuclear liquid aromatic hydrocarbon of the benzene series.

Signed at Pittsburgh, Pennsylvania, this 18th day of July 1931.

ALPHONS O. JAEGER.